(12) United States Patent  (10) Patent No.: US 8,746,522 B2
Nehring  (45) Date of Patent: Jun. 10, 2014

(54) CYCLE CARRIER SYSTEM

(76) Inventor: Peter Nehring, Langley, WA (US)

( * ) Notice: Subject to any disclaimer, the term of this patent is extended or adjusted under 35 U.S.C. 154(b) by 190 days.

(21) Appl. No.: 13/356,648

(22) Filed: Jan. 24, 2012

(65) Prior Publication Data

US 2012/0211535 A1   Aug. 23, 2012

Related U.S. Application Data

(60) Provisional application No. 61/463,723, filed on Feb. 22, 2011.

(51) Int. Cl.
   *B62J 9/00*   (2006.01)
(52) U.S. Cl.
   USPC ............ 224/430; 224/422; 224/435; 224/417
(58) Field of Classification Search
   USPC ......... 224/415, 417, 422, 425, 426, 427, 429, 224/430, 431, 433, 435, 275, 42.11
   See application file for complete search history.

(56) References Cited

U.S. PATENT DOCUMENTS

| | | | |
|---|---|---|---|
| 672,495 A | | 4/1901 | Smith |
| 1,963,333 A | | 6/1934 | Morales |
| 4,050,615 A | | 9/1977 | Kline |
| 4,295,586 A | * | 10/1981 | Shockley ...................... 224/430 |
| 4,345,703 A | | 8/1982 | Allen |
| 4,643,343 A | | 2/1987 | Goldman |
| 5,383,585 A | * | 1/1995 | Weiss ............................. 224/415 |
| 5,423,462 A | * | 6/1995 | Dickhaus ...................... 224/415 |
| 5,667,117 A | * | 9/1997 | Nutto ............................ 224/417 |
| 5,803,329 A | | 9/1998 | Weissenberger |

FOREIGN PATENT DOCUMENTS

| | | |
|---|---|---|
| DE | 3244492 A1 | 6/1984 |
| FR | 2203346 A6 | 5/1974 |
| WO | WO2009/144518 A1 | 12/2009 |

* cited by examiner

*Primary Examiner* — Brian D Nash
*Assistant Examiner* — Corey Skurdal
(74) *Attorney, Agent, or Firm* — Eric G. Halsne

(57) ABSTRACT

An improved carrier system is provided for easy attachment and detachment of the carrier from a wheeled conveyance such as a bicycle or motorcycle. When not attached to the conveyance, the carrier can also be used in a fashion similar to roller luggage.

12 Claims, 13 Drawing Sheets

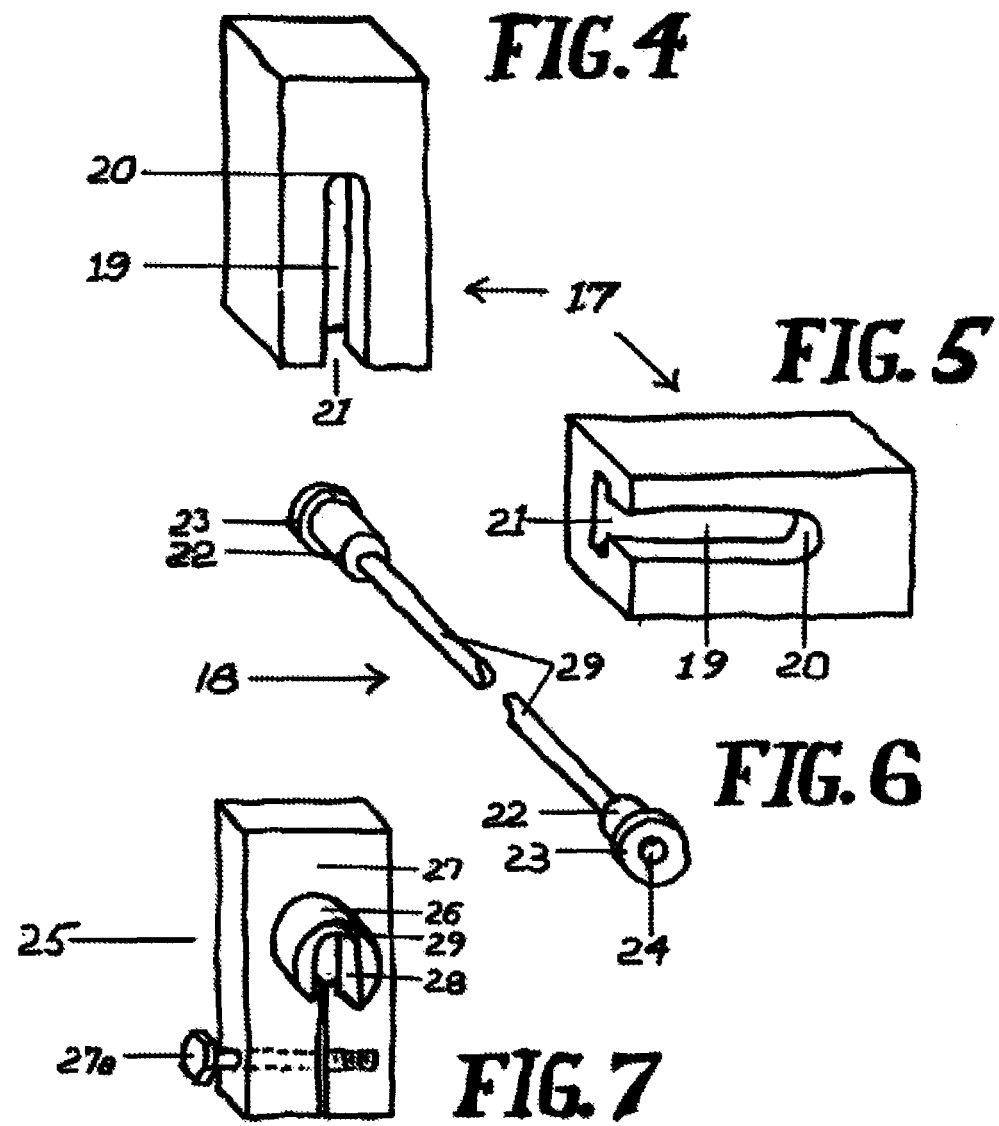

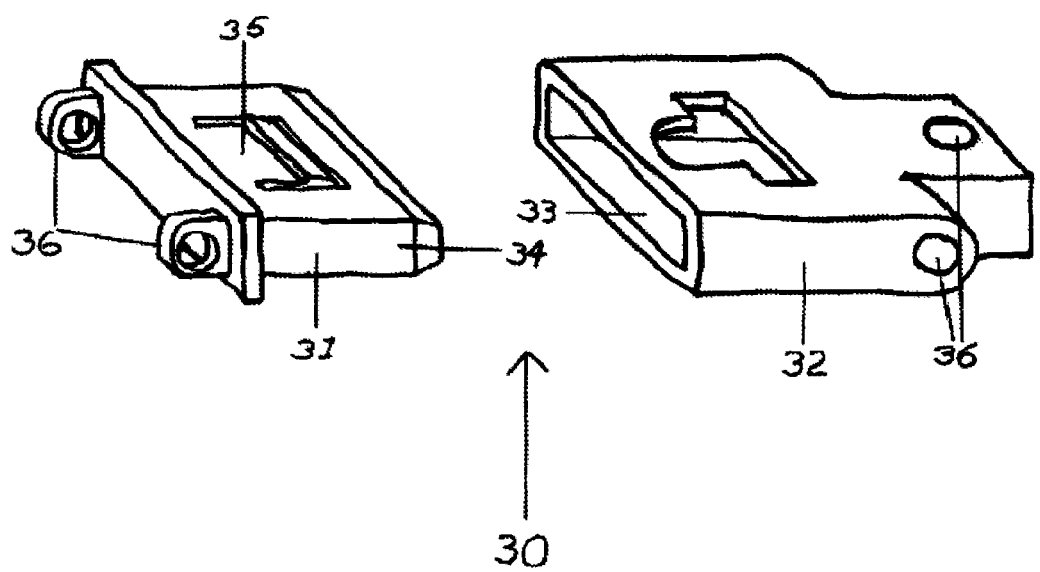

FIG. 14 b
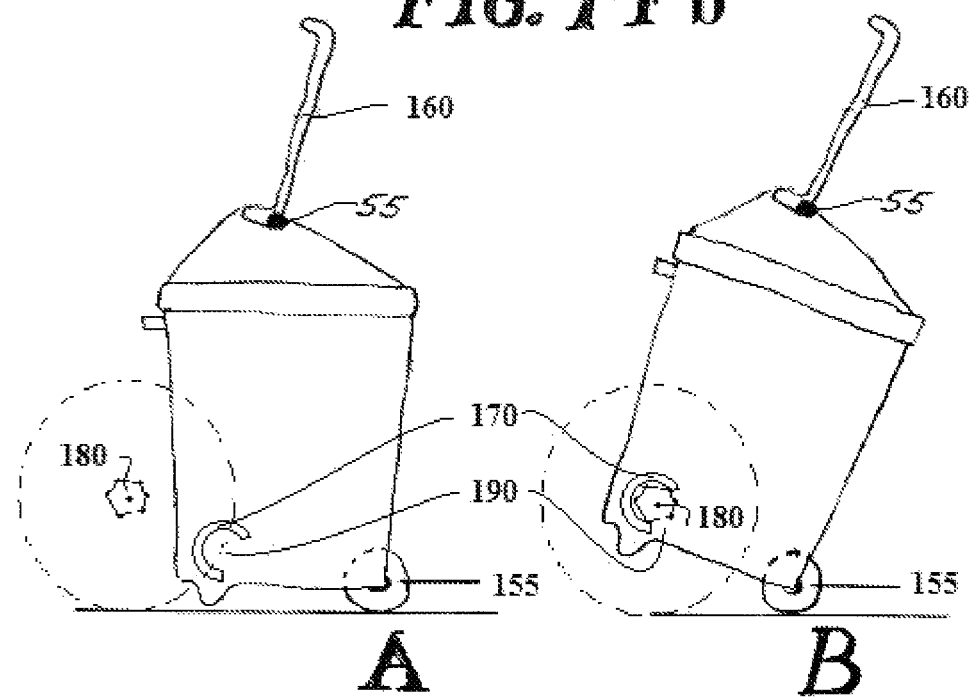
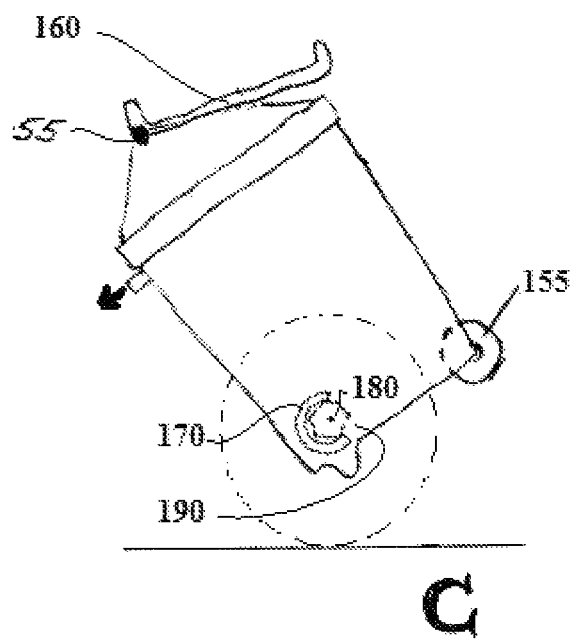

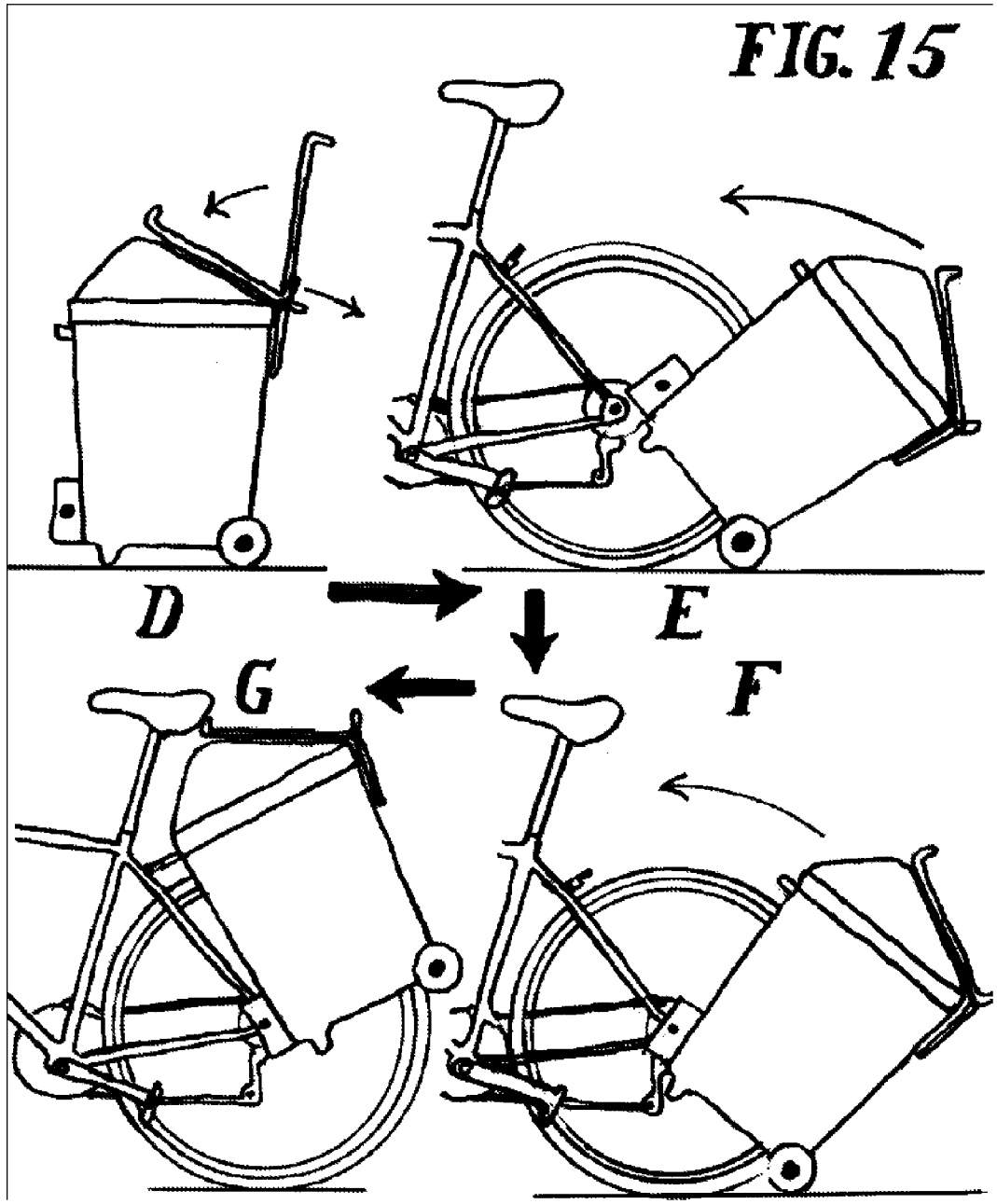

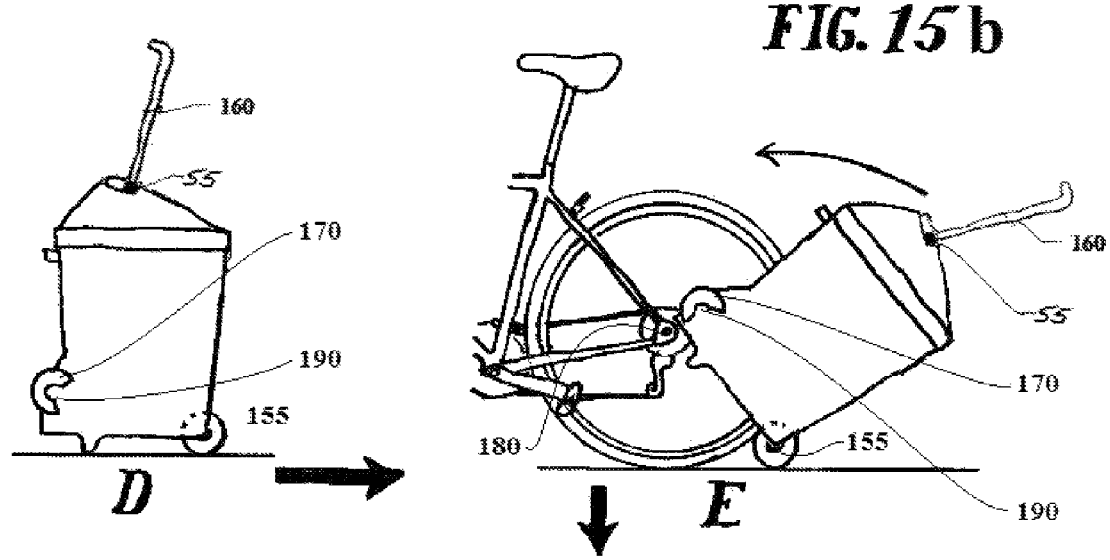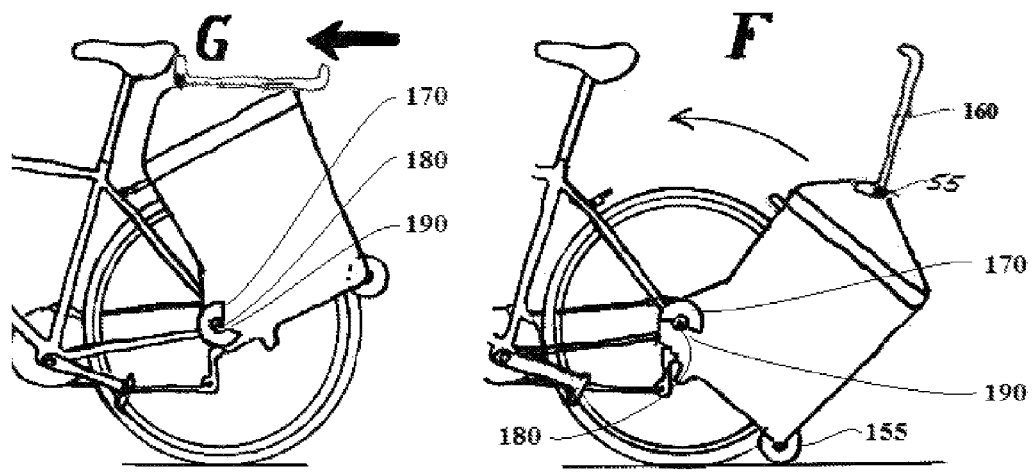
FIG. 15b

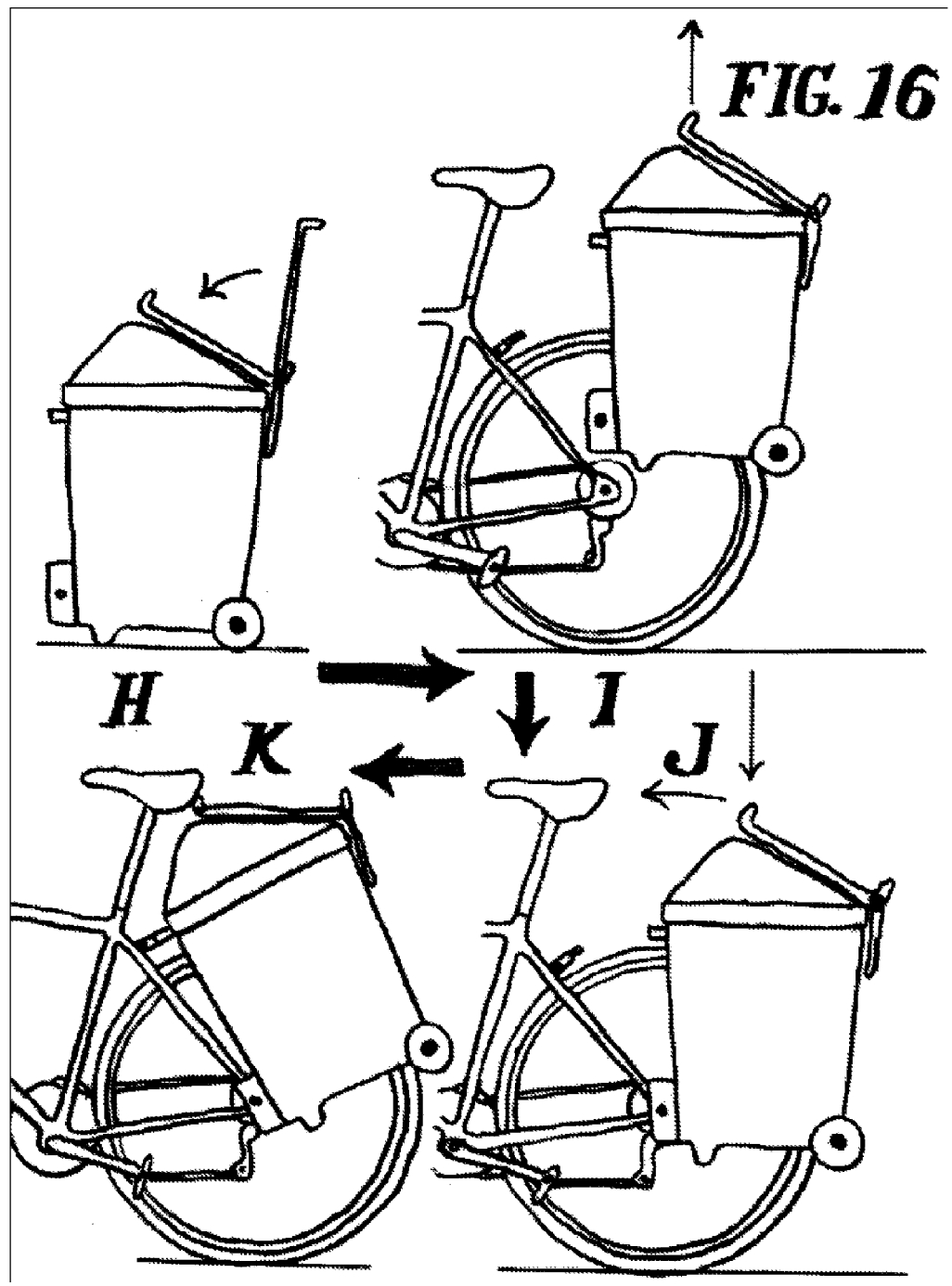

CYCLE CARRIER SYSTEM

BACKGROUND OF THE INVENTION

This invention relates generally to cycle accessories and in particular to carriers which are removably mounted onto cycles for transporting gear and the like.

Many devices exist for carrying articles on open human or motor-powered cycling conveyances, such as bicycles, mopeds, motorcycles, or tricycles. Typically such devices consist of containers in the form of flexible or fabric bags or rigid boxes or baskets which mount on an intermediary carrier rack which is more or less permanently attached to the cycle's frame. When not in use, the rack typically serves no other purpose, adds additional weight to the cycle, and is aesthetically unappealing. Also, the containers when removed from the rack are generally carried by hand, on the shoulder, or on the back of the cyclist. Furthermore, the mounting and dismounting of the containers requires the cyclist to bend, stoop, lift, and/or perform fine manipulation. This becomes more cumbersome and difficult for the cyclist when multiple containers, like panniers, are involved. What is needed is a cycle-transportable container which is simpler to attach and detach, and which is easier to use when detached from the cycle.

SUMMARY OF THE INVENTION

The invention in its general characteristics is a carrier in the form of a rigid container. It is one object of the invention to describe a carrier which when mounted on a cycle straddles its wheel and releasably attaches to the cycle's frame with a quick release connector. The quick release connector has one member that is secured to the cycle's frame and a corresponding mating member affixed to the rigid container. Two lower connectors hold the carrier securely to the cycle wheel axle. Thus, the carrier requires no separate rack for securing to the cycle.

It is yet another object of the invention to describe a carrier which is enhanced with handles and wheels to be transported as roller luggage when off the cycle.

It is yet another object of the invention to describe a method of mounting a carrier to a cycle. The carrier lower connectors are configured in a geometry that, when mounting the carrier on the cycle, the connector is easily aligned on the cycle's axle. The carrier can thereby be pivoted about the lower connectors and along the circumference of the cycle's wheel to a mounted position, where the carrier is then secured to the cycle with the quick release connector. The steps are reversed to dismount the carrier. Thus, the container can be rapidly attached and detached with a minimum of fuss.

BRIEF DESCRIPTION OF THE DRAWINGS

The above invention with its features and enhancements and the method of use including mounting/dismounting and opening is made more apparent and better understood by referring to the following description and drawings of various embodiments wherein:

FIG. 4 is a perspective view of the container's lower connector member showing its inward, top, and front sides.

FIG. 5 is a perspective view of the same connector member showing its bottom, inward, and front sides.

FIG. 6 is a perspective view of the cycle's lower connector member.

FIG. 7 is a perspective view of a further embodiment of the container's lower connector member.

FIG. 8 is a perspective view of the upper connector.

FIG. 14b illustrates side views of an alternate embodiment container in various positions of function.

FIG. 15 is a series of side views demonstrating a method of mounting the container on a bicycle.

FIG. 15b is a series of side views demonstrating an alternate method of mounting the container on a bicycle.

FIG. 16 is a series of side views demonstrating a further method of mounting the container on a bicycle.

DETAILED DESCRIPTION OF THE INVENTION

A description of certain embodiments of the invention is provided, and is intended to be illustrative and to be not limiting of the invention.

Figure 1:
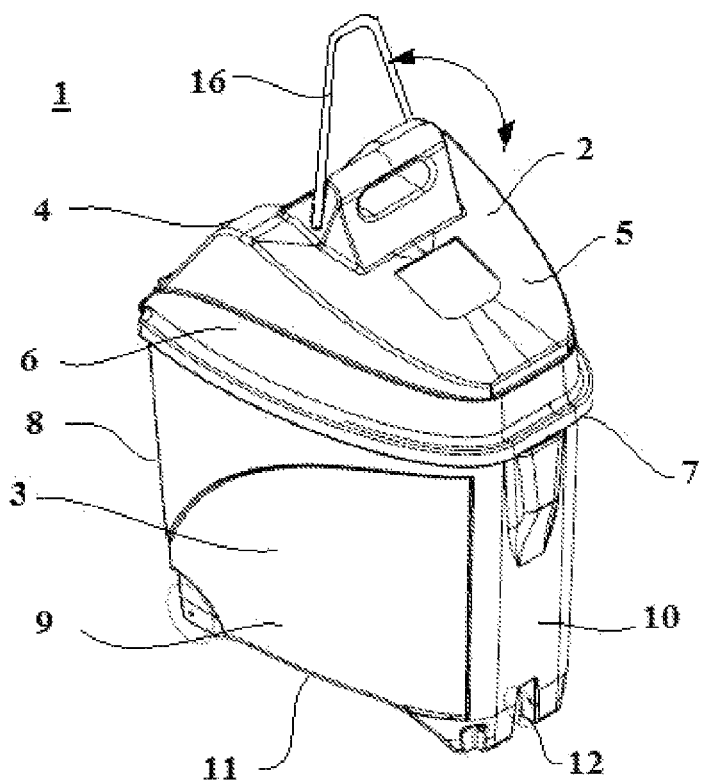
FIG. 1 is a perspective view of the container with its base portion and lid.

Referring now to the drawings, FIG. 1 shows a carrier 1 characterized as a fully enclosable container having a lid 2 and a base portion 3. The lid has a front 4, a top 5, and side 6 walls. The top wall 5 is configured to provide a horizontal platform when the container is mounted on the cycle. The front wall 4 is angled to be generally parallel to the seat tube of a bicycle. The bottom edge 7 of the lid is configured to circumferentially overlap the upper edge of the base portion 3 to provide a weather tight seal. The base portion 3 has front 8, side 9, rear 10, and bottom 11 walls. A wheel well 12 indents the container through its bottom and front walls and is configured to provide sufficient clearance for the cycle's wheel, gear mechanism, brakes, and fender when mounting or in the mounted position on the cycle. A handle 16 is shown hingeably attached to lid 2. Viewing FIG. 3, handle 16 may be thus rotated to a generally horizontal position for stowing. Handle 16 may additionally be extensible for ease of use.

Figure 2:
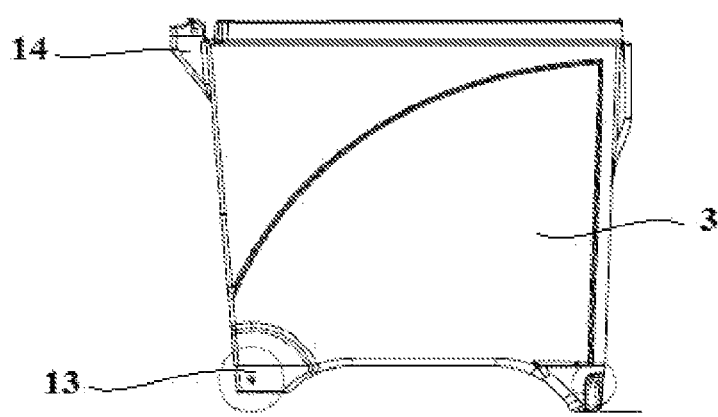
FIG. 2 is a side view of the base portion without the lid and with its lower and upper connector members.

FIG. 2 shows the base portion of the container with its lid removed and with its upper 14 and lower 13 connector members. The upper connector member is affixed above the wheel well region on the front wall 8 and the lower connector members are affixed on the lower region of the front wall lateral to the wheel well.

Figure 3:
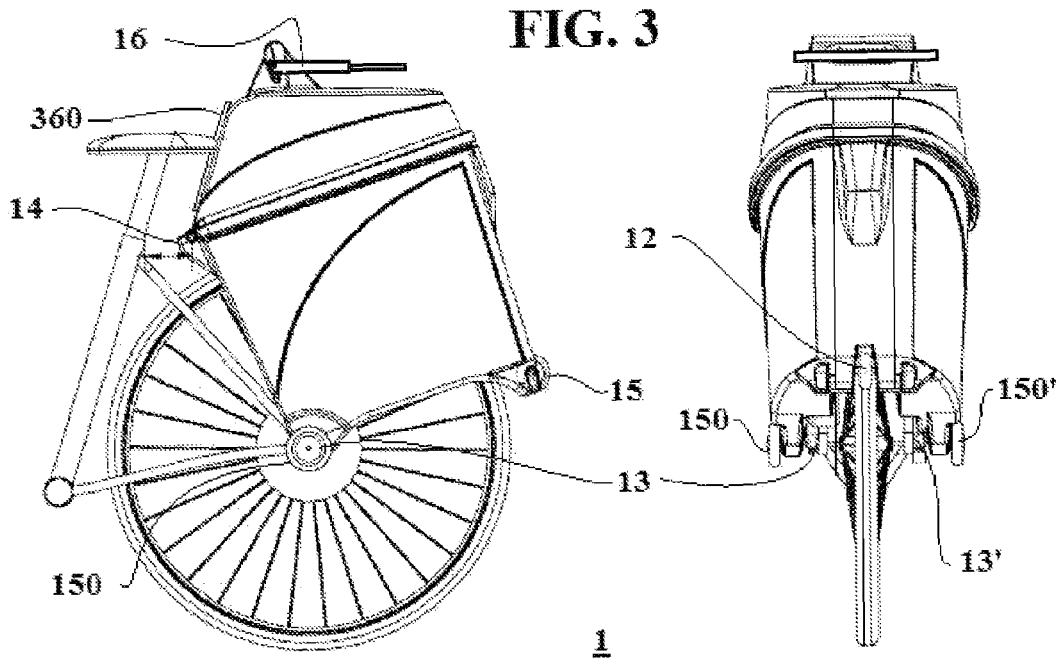
FIG. 3 is a side and rear view of the container mounted on a bicycle.

FIG. 3 shows side and rear views of the container 1 mounted over the rear wheel of a bicycle (partially shown) demonstrating the general position of the connectors to the cycle's frame. The lower connectors 13 and 13' are positioned at or near the ends of the cycle's axle. The upper connector 14 is positioned above the cycle's wheel at the midline in proximity to the cycle's frame. In this depiction it is located on a bicycle's seat post but could also be located at the seat tube, seat stays, seat, or other midline structure of sufficient strength. The wheel well permits the carrier to straddle the cycle's wheel.

The carrier is made sufficiently rigid in the region of the front 8, bottom 11, and wheel well 12 walls to support the connectors 13, 13', and 14. The connector(s) is (are) affixed to the carrier with fasteners (screws, nuts/bolts, rivets, or the like) and/or may interlock with the carrier with mating surfaces.

The container is preferably made of rotomolded plastic, which provides sufficient rigidity and is lightweight, waterproof, and durable. The shape of the container is made to enhance aerodynamics when in use mounted on the cycle. The shape is also made to allow stacking/nesting when multiple containers are stored during manufacture and distribution. Rotomolding plastic allows for recycling and use of recycled materials. The connectors are made of plastic or metal or plastic and metal in combination to provide sufficient strength, precision of fitting, and durability. Handles 16 and wheels 15, 150, 150' can be affixed to the container to facilitate mounting, carrying, and transport of the container, and may be made of plastic, metal, or plastic and metal in combination.

FIGS. 4 and 5 show an embodiment of the lower connector member 17 of the carrier in two perspective views.

FIG. 6 shows the mating lower connector member 18 which is attached to the cycle. The carrier's lower member 17 has a channel 19 that terminates within the member 20. The cycle frame's lower member is a cylindrical stud 22 which may be capped by a flange 23. The channel 19 mates with the corresponding cycle frame's cylindrical stud 22 and flange 23, allowing them to enter at its entry 21 and slide within the channel 19 and stop at the termination 20 where they will act as a support for the load of the carrier. The purpose of the flange is to provide additional lateral support to the carrier. In other embodiments, the lateral rigidity of the saddle structure upon which the lower member 17 is mounted may render the flange 23 unnecessary.

The flange 23 is affixed to the stud 22 with a fastener 24 (screw, compression fitting, or similar). The fastener 24 can be made to fail at excessively high loads of the carrier in order to protect the cycle's frame or attachments from failure or deformity.

FIG. 7 shows a further embodiment of the carrier's lower connector member 25. It consists of two members: a cylindrical member 26 which is inserted in and supported by a block member 27 and is clamped by a screw 27a. The cylindrical member has a channel 28 and termination 29 with similar function as that in the previous embodiment 17. In addition, the cylindrical shape and clamping functions allow adjustability to accommodate various axle widths.

The cycle frame's lower connector member can be attached to the cycle's rear axle by directly screwing onto the axle's threads or can be part of the cycle's quick release skewer, if so provided on the cycle. Alternatively, it can be directly affixed to the cycle's dropout or frame in the region of the axle.

Figure 7B:
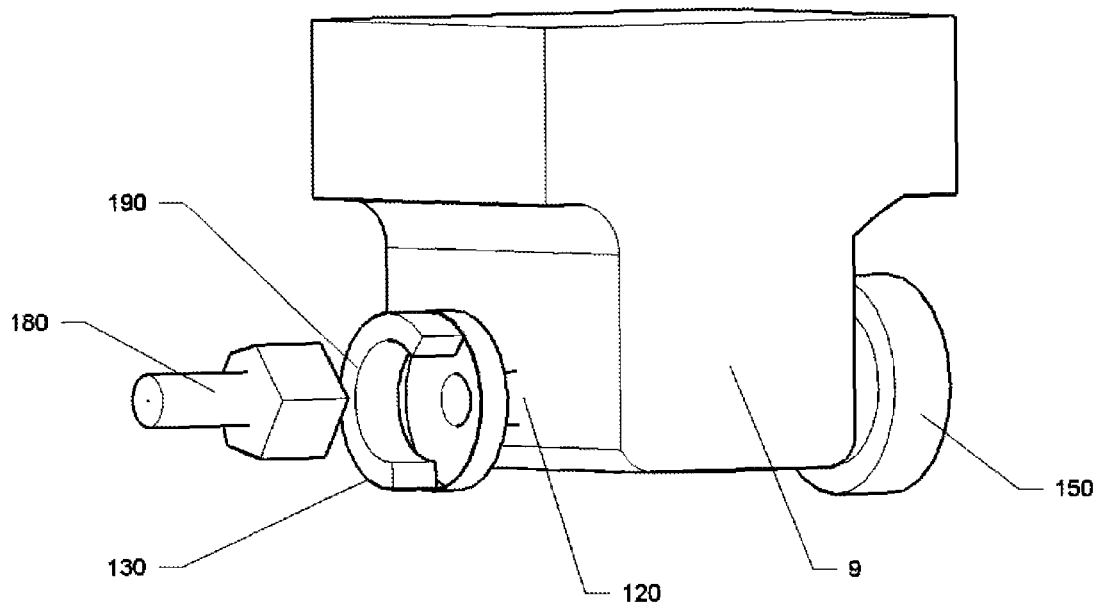
FIG. 7b is a perspective view of yet another embodiment of the lower connector member.

FIG. 7b illustrates one side of an alternate embodiment of the invention, where it is understood that the other side, not shown, is generally a mirror image. In this embodiment, transport wheel 150 is disposed toward the front of the base portion side 9, and is generally coaxial with the lower connector 130. In this embodiment, channel 190 is part of the end cap 130 of a "capped elevator bolt" 120, which performs a similar function as block 13 in the previous embodiment. The channel 190 is machined into the cap 130 of the capped elevator bolt 120. Each channel 190 is sized to fit over a mating lower connector member 180 which is affixed to the conveyance frame. Examples of the mating member 180 are the end nuts of the conveyance wheel axle or the conveyance wheel quick release connector.

The shaft of bolt 120 may serve as the axle for the container wheel 150 and also may be threaded for adjusting the channel 190 positions to various bicycle axle widths.

A positioning wheel 155 may be mounted at the rear of the container 12 to permit easy positioning of the container connectors 130, 130' against the cycle attachment points, as will be described in FIGS. 14 through 16 below.

FIG. 8 shows an embodiment of the carrier's upper connector 30 which has two mating members, one 31 or 32 attached to the cycle and the other 32 or 31 affixed to the carrier. One member has a rectangular or functionally similar projection 34 which is releasably insertable into the other member's rectangular or functionally similar slot 33. The release is performed by depressing the retaining clip 35 in a manner similar to a snap buckle (as is known). The connector members have attachment sites 36 that permit affixing them to the cycle and carrier with fasteners (bolts, nuts, rivets, or similar).

The upper and lower connectors are constructed of plastic or metal or a combination that would provide sufficient strength and reliability.

The container-attached mating member 31 or 32 can be positioned at a number of points on the container. One position is at the top of the container wheel well. More preferably, a plurality of mounting positions is disposed along the front face of the container's lid to accommodate a variety of bicycle configurations. The mounting positions can alternatively be located anywhere along a pair of rails 360 disposed on the container lid. The pair of rails 360 could also serve as a mounting location for handle 16.

The inventor has discovered that a preferred position for the cycle-attached mating member 31 or 32 is to have it attached to the small tubes that are part of the cycle seat's understructure. In this position the underneath portion of the seat acts as a bolster to prevent the upper connector from deflecting upwards. This gives it the additional mechanical advantage of securely holding down the container, which keeps the lower connectors firmly secured against the cycle's axle. If the upper connector is positioned elsewhere then an additional rigid bracket may be provided to similarly prevent the buckle's deflection. This bracket can be attached to either the rails or the seat post or both, and presses against the connector.

In an alternate embodiment of upper connector 30, one mating member 31 or 32 is attached to a bracket. The bracket in turn is rigidly attached to the hinge pin of the lid 2 at one end and to the front of the wheel well 12 on the base portion 3 at the other end. The arrangement forms a strong and rigid loop, which can also function as a place to attach a lock should the container need to be locked for security reasons.

Figure 9:
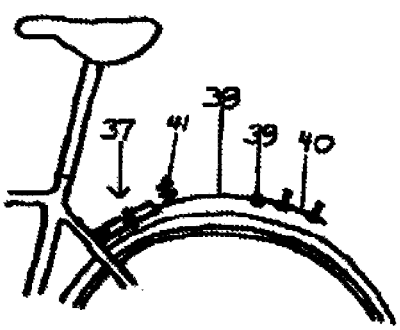
FIG. 9 is a perspective view of a further embodiment of the upper connector attached to a bicycle.

FIG. 9 demonstrates a further embodiment 37 of the upper connector. It has similar mating members to that of the previous embodiment 30; however, the carrier's member is affixed to a rigid bar 38, which is hinged 39 and then affixed 40 to the carrier's wheel well along its circumference. A resilient member 41 (spring or viscoelastic device) is positioned between the bar 38 and the carrier. This embodiment allows a mechanism for suspension and vibration isolation of the carrier from the cycle. The range of motion of the carrier occurs within the vertical plane and is limited to less than the length of the channel 19, 28 of the lower connector to prevent detachment.

Figure 10:
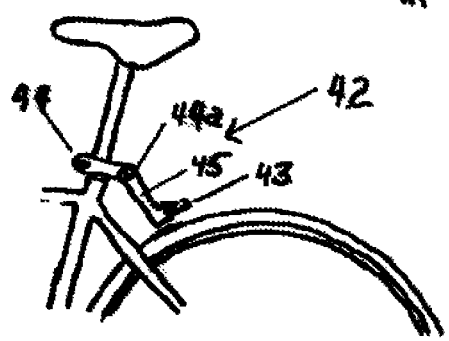
FIG. 10 is a perspective view of a further embodiment of the cycle's upper connector member attached to a bicycle.

FIG. 10 is a further embodiment 42 of the cycle's upper connector member. It has the same upper connector member 43 as the first embodiment 31 or 32, however, the fixation to the cycle is with a clamp 44 that supports a bar 45 which supports the connector 31 or 32. The clamp attaches to the cycle's seat post, seat tube, or seat stays. The clamp can be a quick release type. The bar can be hinged 44a to allow for adjustability and/or functional cooperation with the cycle's rear suspension, if provided.

Figure 11:
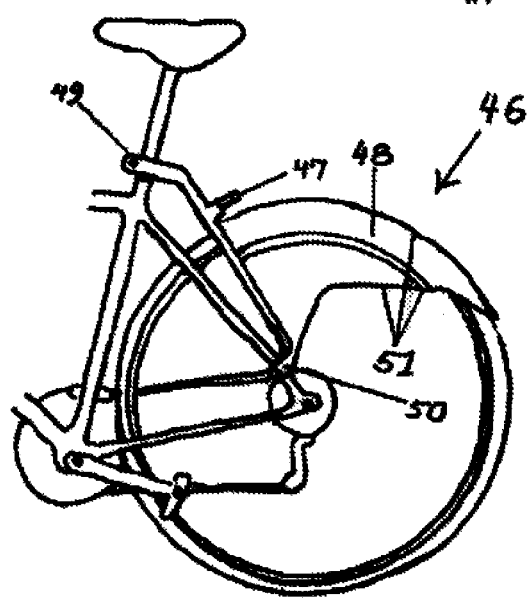
FIG. 11 is a perspective view of a further embodiment of the cycle's upper connector member attached to a bicycle.

FIG. 11 is a further embodiment 46 of the cycle's upper connector member. It has the same upper connector member 47 as the first embodiment 31 or 32, which is part of a fender-like member 48. The fender-like member is attached to the cycle's frame at an upper attachment site 49 on the seat, seat post, seat tube, or seat stays and at lower attachment sites 50 on the seat stays, dropouts, or rear axle ends. (These lower attachment sites may not be necessary and can be eliminated if the upper attachment site proves to be sufficiently strong and stable.) The fender portion 48 of the connector has edges and surfaces 51 that mate with the wheel well of the carrier and act as a guide for mounting the carrier as well as a support when mounted. This will allow for a similar motion in mounting as the embodiments which utilize lower connectors, with the container pivoting about the axis of the cycle's wheel. An advantage of this embodiment is the elimination of lower connectors while maintaining the same methods of mounting the carrier. This embodiment also acts as a mud/splash guard with the carrier on or removed.

Figure 12:
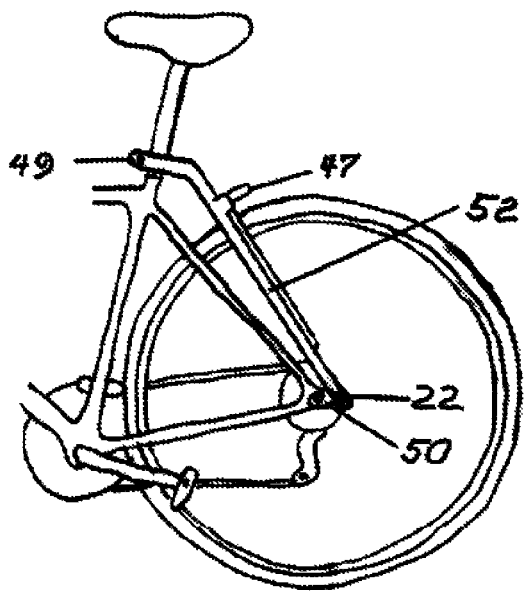
FIG. 12 is a perspective view of a further embodiment of the cycle's upper and lower connector members attached to a bicycle

FIG. 12 is a further embodiment of the cycle's connectors which are affixed to a singular member 52 which acts as a sub-frame. This sub-frame is affixed to the cycle's frame in positions and manners 49, 50 similar to the previous embodiment. The upper connector member 47 and lower cylindrical stud 22 function as in the previous embodiments. The sub-frame is constructed of plastic or metal or a combination to provide sufficient strength and reliability. An advantage of this embodiment is that it provides a lightweight sub-frame that is unobtrusive and can fit a large variety of cycle sizes and styles.

Figure 13:
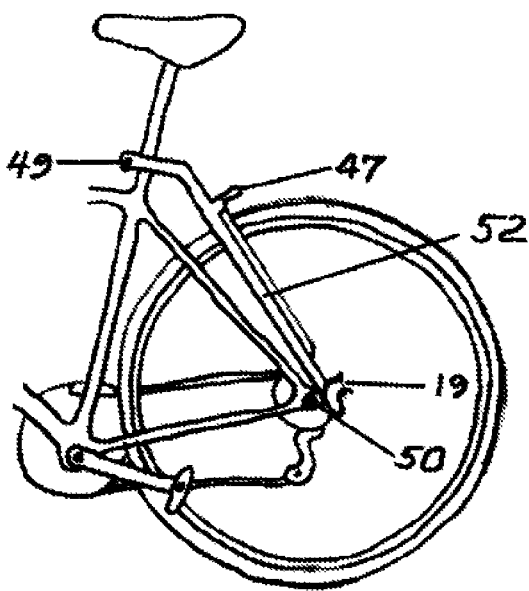
FIG. 13 is a perspective view of a further embodiment of the cycle's upper and lower connector members attached to a bicycle.

FIG. 13 is a further embodiment of the cycle's connectors affixed to a sub-frame 52 which is similar to the previous embodiment. In this embodiment the cycle's upper connector member is the same. The lower connectors have changed in that the cycle's members are the channels 19 which guide and support the studs 22 which are affixed to the carrier's lower connector members. The termination of the cycle's lower connector channel 19 provides the support for the stud 22 of the carrier's lower connector in the region of the end of the cycle's axle. The advantage of this embodiment is similar to that of the previous embodiment, and it provides an additional means to obtain clearance of certain obstacles on the cycle, including axle ends, disc brakes, gear change mechanisms, and accessories.

Figure 14:
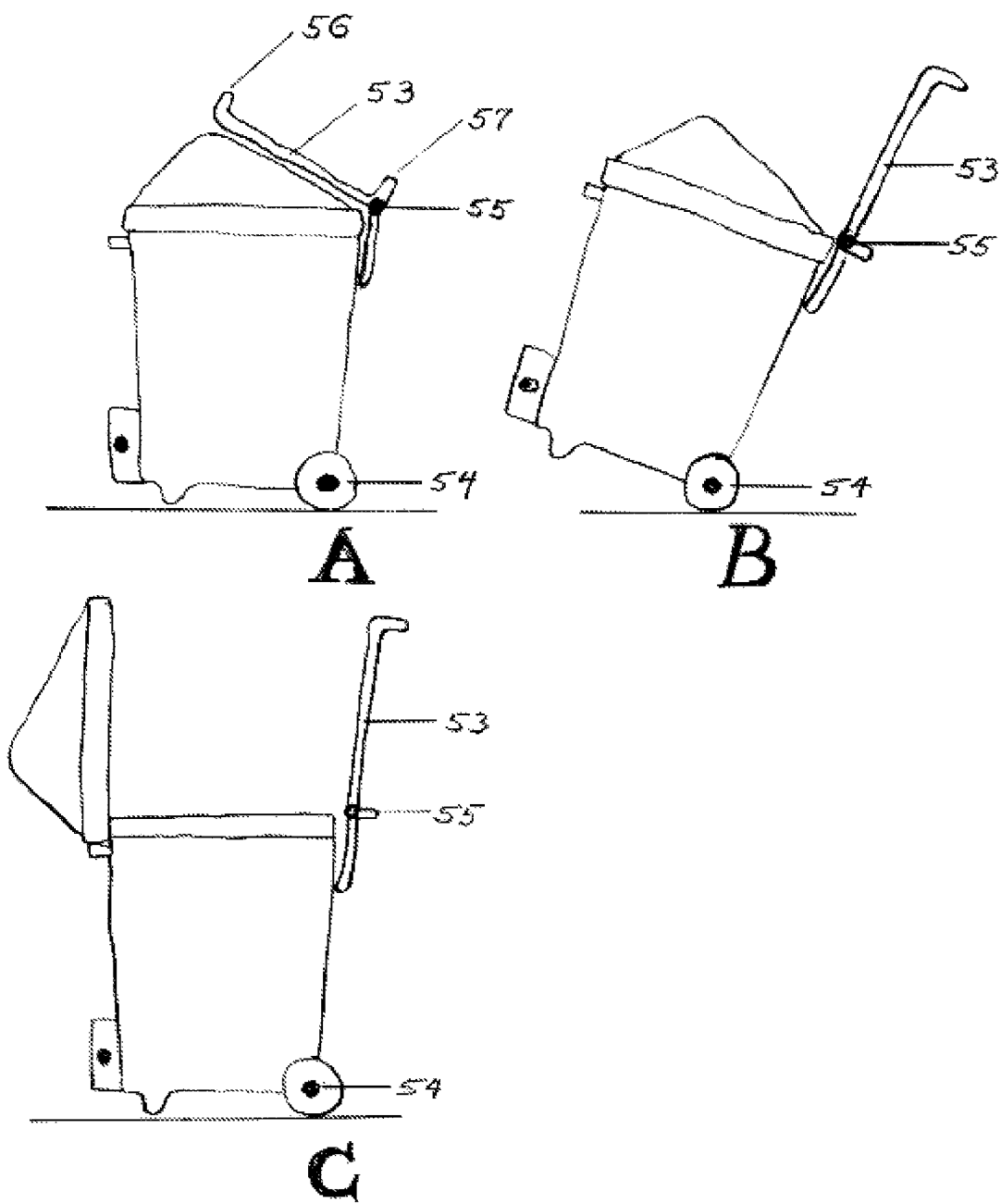
FIG. 14 illustrates side views of the container in various positions of function.

FIG. 14 is a series of side views of the container with handle 53 and wheels 54 attached and in various positions of function A, B, C. In this embodiment, the handle 53 is attached to the upper rear wall of the container's base portion and has a hinge mechanism 55. When hinged forward the handle attaches to the lid by a releasable latch mechanism (not depicted). The releasable latch mechanism can be a clip, hook, or similar device that would allow securement of the handle upon the lid. This handle securement additionally secures the lid on to the base portion of the container, preventing its opening. In the down position the handle provides grab points 56, 57 for lifting when the handle is latched to the lid (position A). In the up position, the handle 53 allows the container to be tilted and rolled on its wheels 54 as roller luggage (position B). Also, with the handle in the up position, the container is openable by lifting and pivoting the lid 2 on a hinge mounted at the front (position C).

FIG. 14b illustrates an alternate embodiment of the container, having a positioning wheel 155 attached on the bottom portion rear side of the container. Wheel 155 is preferably located along the centerline of the container coplanar with the wheel well. An alternative handle 160 is also shown, having the hinge mechanism 55 being located forward, near the top of the lid. Although not shown here, this embodiment may retain the rolling wheels 150 at the location shown in FIG. 7b. This embodiment would enable more convenient rolling of the container in the alternate wheeled location coaxial with the lower connectors, as described above.

FIG. 14b also illustrates various positions of function A, B, and C, wherein a lower connector member 170 having a channel 190 is fitted over a mating lower connector member 180 which is affixed to the cycle frame. Positioning wheel 155 is used in Positions A and B to engage channel 190 over member 180, after which the container is rotated about member 180 into a secured. latched Position C. After the container is secured, handle 160 may be stowed for travel.

Also (not depicted), with the handle in the latched position and with the container mounted on a cycle, the handle can serve as attachment points for elastic straps or similar devices to secure items on the horizontal platform surface 5 of the lid.

FIG. 15 is side views of the carrier and the rear portion of a bicycle demonstrating a method of mounting. In position D the handle is hinged forward and latched against the lid and the container is tilted backward on its wheels. In position E the container is rolled toward the rear of a cycle, straddling its rear wheel, and the lower connectors are brought into proximity with each other. In position F the lower connectors are engaged as the studs slide in their corresponding channels (or, as in the embodiment of FIG. 11, the wheel well 12 engages with the fender 51) and come to rest at their terminations. The container is then pivoted forward on or about the axis of the rear axle. In position G the upper connector is then engaged, which thereby prevents disengagement of the lower connectors (or, as in the embodiment of FIG. 11, the wheel well and the fender). Dismounting is the reverse of this sequence.

Similarly, FIG. 15b is a series of side views of the carrier and the rear portion of a bicycle demonstrating a method of mounting. In position D the handle is hinged forward and latched against the lid and the container is tilted backward on its wheels. In position E the container is rolled toward the rear of a cycle, straddling its rear wheel, and the lower connectors 170 are brought into proximity with the mounting points on the cycle, seen here as mating lower connector member 180. In position F the lower connectors 170 are engaged to the cycle as the channels 190 slide over their corresponding mating members 180 and come to rest at their terminations. The container is then pivoted forward on or about the axis of the rear axle. In position G the upper connector is then engaged, which thereby prevents disengagement of the lower connectors (or, as in the embodiment of FIG. 11, the wheel well and the fender). FIG. 15b clearly illustrates that the rotation of the container at F causes the lower arm of the connector 170 to hook around mating member 180, such that subsequent locking of the container at the upper connector at position G also vertically locks the connector 170 to mating member 180. Dismounting of the container is the reverse of this sequence.

FIG. 16 is side views of the carrier and the rear portion of a bicycle demonstrating another method of mounting. In position H the handle is hinged forward and latched against the lid. In position I the container is lifted with the handle over the rear of the cycle straddling its rear wheel. The lower connectors are brought into proximity with each other. In position J the container is lowered and the lower connectors are engaged as the studs slide in their corresponding channels (or, as in the embodiment of FIG. 11, the wheel well 12 engages with the fender 51) and come to rest at their terminations. The container is then pivoted forward on or about the axis of the rear axle. In position K the upper connector is then engaged, which thereby prevents disengagement of the lower connectors (or, as in the embodiment of FIG. 11, the wheel well and the fender). Dismounting is the reverse of this sequence.

Figure 17:
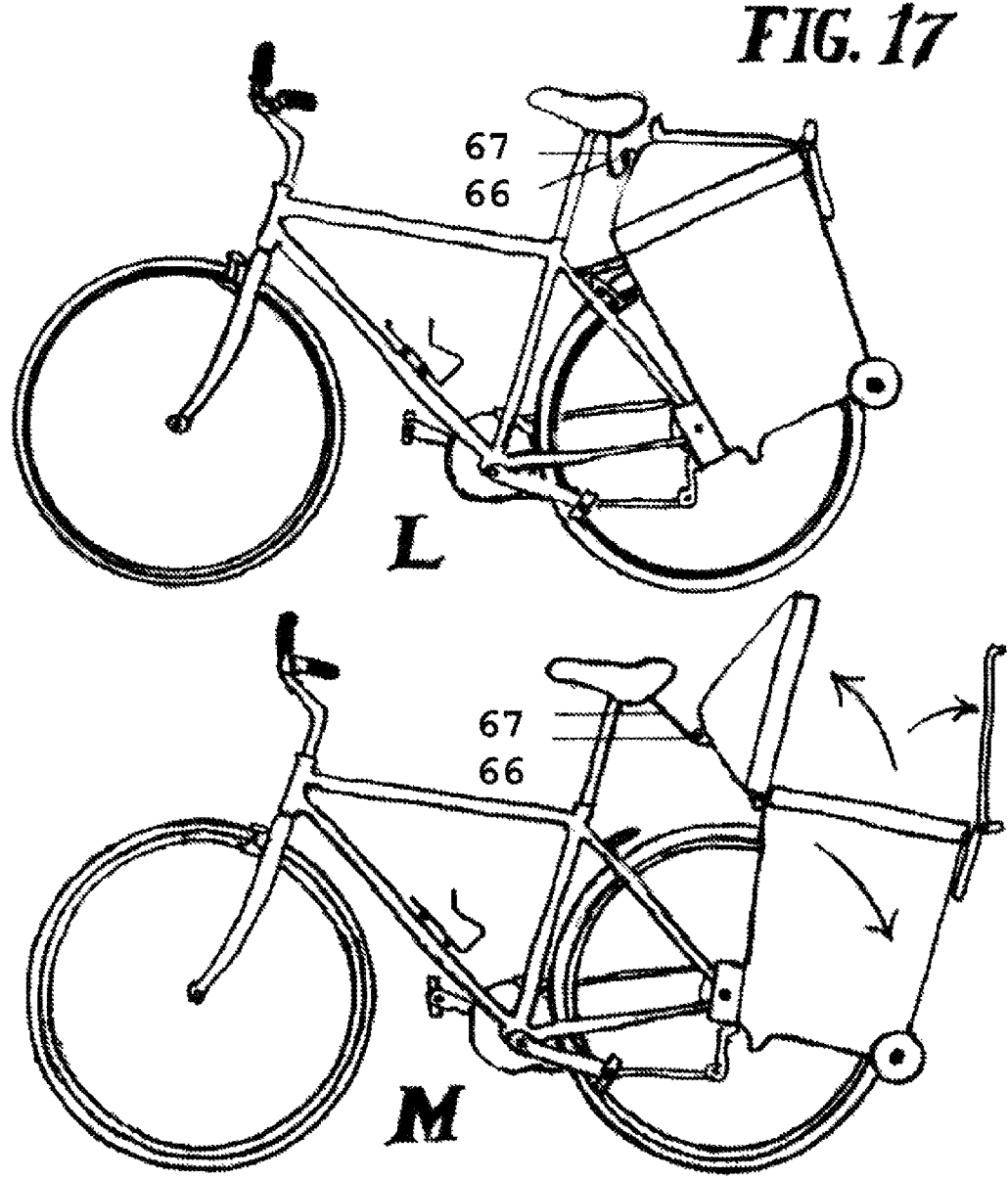
FIG. 17 is a series of side views demonstrating a method of opening the container when mounted on a bicycle.

FIG. 17 are side views of the container mounted on a bicycle demonstrating a method of opening the container. The lid of the container has a connection point 66 on its front wall 4 where a cord 67 is connected. The other end of the cord is releasably attached to the seat or seat post of the cycle. In position L the handle is latched against the closed lid and the upper connector is engaged. The cord 67 is slack. In position M the handle is unlatched and extended. The lid is let open as the weight of the container pivots the container rearward to the point where there is no more slack in the cord.

The advantages of this invention are that it provides a cycle carrier system with connector(s) that allow(s) a container that is weather tight, aerodynamic, lightweight, rugged, made of recyclable material, and of large capacity to be easily and securely mounted on a cycle without the need for stooping or fine manipulation or tools and to be used as roller luggage off the cycle.

The above description of the invention with its embodiments and methods is intended to be illustrative and various modified embodiments will become apparent to those persons of ordinary skill in the art. For example, the carrier can be easily configured to be mounted to a bicycle, electric bicycle, moped, motorcycle or tricycle. The inventive carrier can also be used on a front wheel in addition to the aforedescribed rear wheel mount. The invention, therefore, is not intended to be limited by the above description but by all embodiments and methods within its scope and spirit.

The invention claimed is:

1. A detachable over-wheel carrier suitable for mounting to the frame of a passenger conveyance having a wheel with an axle and two axle ends, comprising:
    a rigid container having a bottom portion, a first and a second side portion and a top portion, having a wheel well formed in the bottom portion;
    a lid disposed on the container top portion;
    a handle hingeably connected to the lid;
    a first wheel disposed on the first side portion of the container;
    a second wheel disposed on the second side portion of the container;
    first and second lower connector members arranged to engage the conveyance frame at the respective wheel axle ends; and
    a quick release upper connector disposed to connect the rigid container to the conveyance frame at a location above the conveyance wheel,
    wherein the first and second lower connector members are disposed to vertically lock the container to the frame only when the quick release connector is connected to the conveyance frame, wherein the first wheel is coaxially disposed with the first lower connector, and the second wheel is coaxially disposed with the second lower connector.

2. The detachable over-wheel carrier of claim 1, further comprising:
    a positioning wheel disposed on the bottom portion coplanar with the wheel well.

3. The detachable over-wheel carrier of claim 1, wherein the first and second lower connector members further comprise a channel shaped to engage the respective wheel axle end.

4. The detachable over-wheel carrier of claim 3, wherein each of the first and second lower connector members further comprise an elevator bolt having a threaded shaft and a cap into which the channel is formed.

5. The detachable over-wheel carrier of claim 4, wherein the first and second side portions further comprise a threaded socket for adjustably receiving the respective elevator bolt threaded shaft.

6. The detachable over-wheel carrier of claim 1, wherein the lid is disposed on the container top portion with a hinge and a latch.

7. The detachable over-wheel carrier of claim 1, wherein the handle is extensible.

8. The detachable over-wheel carrier of claim 1, wherein the rigid container further comprises a plurality of compartments.

9. The detachable over-wheel carrier of claim 1, wherein the rigid container is comprised of a molded polymeric material.

10. The detachable over-wheel carrier of claim 1, wherein the quick release upper connector further comprises a mating member disposed to be affixed to the frame and a corresponding second mating member disposed to be affixed to the rigid container.

11. The detachable over-wheel carrier of claim 10, further comprising a mounting rail disposed on the rigid container, to which the second mating member is adjustably affixed.

12. The detachable over-wheel carrier of claim 10, further comprising:
    a cord attached to the lid; and
    a second quick release connector arranged to attach the cord to the frame.

* * * * *